United States Patent
Shirai et al.

(10) Patent No.: US 6,513,978 B2
(45) Date of Patent: Feb. 4, 2003

(54) ROLLING ELEMENT SPACERS FOR ROLLING GUIDE UNITS

(75) Inventors: Takeki Shirai, Tokyo (JP); Hiroshi Niwa, Tokyo (JP); Kentarou Nishimura, Tokyo (JP); Yasuyuki Abe, Tokyo (JP); Kiyomi Tamura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/949,992

(22) Filed: Sep. 12, 2001

(65) Prior Publication Data

US 2002/0031285 A1 Mar. 14, 2002

(30) Foreign Application Priority Data

Sep. 12, 2000 (JP) ......................................... 2000-276443

(51) Int. Cl.$^7$ ............................................... F16G 29/06
(52) U.S. Cl. ....................... 384/45; 384/520; 74/424.88
(58) Field of Search ........................... 384/45, 43, 520; 74/424.82–424.88

(56) References Cited

U.S. PATENT DOCUMENTS

| | | | | |
|---|---|---|---|---|
| 6,070,479 A | * | 6/2000 | Shirai | 74/424.88 |
| 6,082,210 A | * | 7/2000 | Ise | 384/45 |
| 6,095,009 A | | 8/2000 | Takagi | 74/459 |
| 6,113,274 A | | 9/2000 | Horimoto | 384/43 |

FOREIGN PATENT DOCUMENTS

DE   199 25 040 A1   12/1999
GB   1175810   12/1969

OTHER PUBLICATIONS

Japanese Patent Abstract Only 57–101158, Jun. 23, 1982, N. Hiroshi.
Japanese Patent Abstract Only 11–315835, Nov. 16, 1999, S. Chuichi.
Japanese Patent Abstract Only 2000–120825, Apr. 28, 2000, M. Kazuo et al.
Japanese Patent Abstract Only 11–182545, Jul. 6, 1999, K. Akihiko et al.
Japanese Patent Abstract Only 10–281154, Oct. 20, 1988, K. Akihiko et al.
Japanese Patent Abstract Only 08232961, Sep. 10, 1996, T. Hiroshi.
Japanese Patent Abstract Only WO 99/60281, Nov. 25, 1999.

* cited by examiner

Primary Examiner—Lenard A. Footland
(74) Attorney, Agent, or Firm—Arent Fox Kintner Plotkin and Kahn

(57) ABSTRACT

The present invention provides rolling element spacers used in a rolling guide unit provided with an endless circulating passage for balls; arranged with plural balls alternately therewith in the endless circulating passage; and circulated with these balls in the endless circulating passage. Each of the rolling element spacers has a pair of retaining seats which the balls contact, and is formed so that, on a ball cutting plane perpendicular to the center of rotation of each ball, each retaining seat and a relative ball contact each other at only the two portions of the retaining seat that are in the vicinity of both ends thereof.

5 Claims, 5 Drawing Sheets

ROLLING ELEMENT SPACERS FOR ROLLING GUIDE UNITS

BACKGROUND OF THE INVENTION

1. Field of the Invention

This invention relates to rolling element spacers for various types of rolling guide units, such as a linear guide unit, a ball screw unit and the like provided with an endless circulating passage for rolling elements, such as balls and rollers, the rolling elements being adapted to be interposed between adjacent rolling elements in the endless circulating passage, reduce the abrasion and generation of heat of the rolling elements and smooth the rolling of the rolling elements.

2. Description of the Related Art

The known rolling guide units in which a pair of members make relative movements continuously via a row of endlessly circulating balls and rollers include a linear guide unit used in a linear guide portion of a machine tool and a transfer apparatus and adapted to guide a movable member, such as a table on a fixed portion, such as a bed or a saddle; and a ball screw used with this linear guide unit and adapted to give strokes of linear movements to the movable member in accordance with an amount of rotations of a motor.

The first-mentioned linear guide unit includes a track rail provided on such a fixed portion as mentioned above and having rolling surfaces, which extend in the longitudinal direction, for the rolling elements; and a slide block which has load rolling surfaces opposed to the rolling surfaces of the track rail via plural rolling elements, and which is provided with endless circulating passages for the rolling elements rolling on these load rolling surfaces, the movable member-supporting slide block being moved linearly and continuously along the track rail. Conversely, some linear guide units are formed so that a track rail is moved with respect to a fixed slide block.

The second-mentioned ball screw includes a screw shaft provided with a helical ball rolling groove formed at a predetermined lead angle; and a nut member having a load rolling groove opposed to the ball rolling groove via plural balls, and provided with an endless circulating passage for the balls rolling on this load rolling groove; the balls being circulated in the endless circulating passage in accordance with the relative rotational movements of these screw shaft and nut member, the nut member and screw shaft being thereby moved relatively in the axial direction.

In such rolling guide units, a rolling element, such as each of the balls and rollers circulating in the endless circulating passage contacts the rolling elements positioned on the front and rear sides thereof. Therefore, when the rolling guide units are used at a high speed, there is the possibility that the rolling elements wear comparatively early due to the mutual abrasion of, for example, the rolling elements, and that the rolling elements and load rolling surface seize due to frictional heat. When the moving direction is reversed, i.e., when the direction in which the rolling elements are circulated is reversed, the arrangement of the rolling elements in the endless circulating passages is liable to get out of order. In an extreme case, a so-called locking phenomenon in which the rolling elements stop up in the endless circulating passage occurs, so that there is the possibility that the rolling guide unit itself becomes inoperable. Japanese Patent Laid-Open No. 315835/1999 discloses as a rolling guide unit adapted to eliminate these drawbacks a rolling guide unit in which rolling element spacers are interposed between rolling elements adjacent to each other in an endless circulating passage.

In the rolling guide unit disclosed in this publication, rolling element spacers of a synthetic resin called "separator" are arranged alternately with balls in an endless circulating passage, and the contact of one ball with another is thereby prevented. Such separators are formed in the shape of a disc the outer diameter of which is smaller than the diameter of the balls, and provided on both the front and rear surfaces thereof with ball retaining seats the radius of curvature of which is larger than that of the spherical surface of each ball. When the balls and separators are thereby arranged alternately without causing clearances to occur in the endless circulating passage, each ball is held between a pair of separators adjacent to front and rear sides thereof. Accordingly, even when the direction in which the balls are circulated is reversed, the balls are circulated with the separators in the endless circulating passage without causing the row of the balls and separators to be disordered.

However, when the ball retaining seats slidingly contacting the balls are formed concavely to a radius of curvature larger than that of the spherical surface of each ball just as those of the rolling element spacer disclosed in Japanese Patent Laid-Open No. 315835/1999, clearances occur between a circumferential portion of the ball retaining seat and balls, and the balls shake with respect to the rolling element spacers. Therefore, the meandering of the balls in the endless circulating passage cannot be completely eliminated.

From the viewpoint of the prevention of the meandering of the balls in the endless circulating passage, it is necessary that the balls settle without being shaken on the ball retaining seats of the rolling element spacers. In order to meet the requirement, it is necessary that the ball retaining seats be formed so as to have concave surfaces which are substantially in conformity with the spherical surfaces of the balls. However, when the ball retaining seats are formed so as to have such concave surfaces, the contact surface area of each ball and a relative ball retaining seat becomes large. This causes a fear that an increase in the slide contact resistance of the rolling element spacers with respect to the balls, early wear on the rolling element spacers, etc. occur.

SUMMARY OF THE INVENTION

The present invention has been made in view of the above-mentioned circumstances, and provides rolling element spacers capable of improving the stability of rolling elements with respect to retaining seats to a high level, stabilizing the alignment of the rolling elements and rolling element spacers in endless circulating passages, and reducing the slide contact resistance exerted on the rolling elements.

According to an aspect of the present invention, the rolling element spacers used for a rolling guide unit in which a pair of members make relative continuous movements via rows of endlessly circulating rolling elements, interposed between adjacent rolling elements in endless circulating passages and circulated with the rolling elements therein, have a pair of retaining seats respectively which the rolling elements slidingly contact, each retaining seat and a relative rolling element contacting each other on rolling element cutting planes perpendicular to the axis of rotation thereof, at only the two portions of the retaining seat which are in the vicinity of both ends thereof.

According to such technical devices, each retaining seat and a relative rolling element contact each other on rolling element cutting planes perpendicular to the axis of rotation thereof, at only the two portions of the retaining seat which are in the vicinity of both ends thereof. Therefore, the spherical surface of a ball or the outer circumferential surface of a roller fits in a stable condition in a relative retaining seat, and the seating condition of the rolling element with respect to the retaining seat becomes stable. Accordingly, when such rolling element spacers and rolling elements are arranged alternately in the endless circulating passages in a rolling guide unit, the alignment of these rolling elements and rolling element spacers are stabilized, and the meandering of the rolling elements in the endless circulating passages can be prevented.

On the rolling element cutting planes perpendicular to the axis of rotation thereof, each retaining seat and a relative rolling element contact each other at only the two portions in the vicinity of both ends of the retaining seat. For example, when the rolling element is a ball, the ball and a relative retaining seat contact each other annularly. Namely, since the center of each retaining seat and the relative rolling element are in a non-contacting state, it becomes possible to minimize the contact area of the retaining seat and rolling element, and thereby reduce the slide contact resistance exerted on the rolling element.

Moreover, according to the present invention, the center of each retaining seat and a relative rolling element are in a non-contacting state, and the center of each retaining seat does not contribute at all to the alignment of the rolling elements. Therefore, a communication through hole extending between the retaining seats can be provided, and this communication hole can be utilized as a lubricating oil reservoir.

In a ball screw unit, the rolling speed of balls held between a helically formed load rolling groove of a nut and a ball rolling groove of a screw shaft varies finely due to errors of formation of these grooves, so that a distance between the balls rolling as they impart a load to the groove of the nut also varies. Therefore, when the rolling element spacers have a high rigidity in the rolling element arranging direction, the balls and rolling element spacers are put in a forcibly pushing state with respect to one another in the endless circulating passage at the time of the occurrence of a decrease in the distance between the balls due to the above-mentioned reasons, and the balls are stopped up in the endless circulating passage. Consequently, in view of the necessity of absorbing a fine variation of the distance between the adjacent balls, it is preferable to give an elasticity to the rolling element spacers in the rolling element arranging direction by forming grooves in outer circumferential surfaces surrounding the circumferences of the retaining seats.

As has been described above, according to the rolling element spacers of the present invention, the spherical surfaces of the balls or the outer circumferential surfaces of the rollers fit stably in the retaining seats, and the seating condition of the rolling elements with respect to the retaining seats becomes stable. Since the center of each retaining seat and a relative rolling element are in a non-contacting state, it becomes possible to reduce the contact area of each retaining seat and a relative rolling element, improve the seating condition of the rolling elements with respect to the retaining seats, stabilize the alignment of the rolling elements and rolling element spacers in an endless circulating passage, and reduce a slide resistance exerted on the rolling elements.

DESCRIPTION OF THE PREFERRED EMBODIMENTS

The rolling element spacers according to the present invention will now be described in detail on the basis of the attached drawings.

Figure 1:
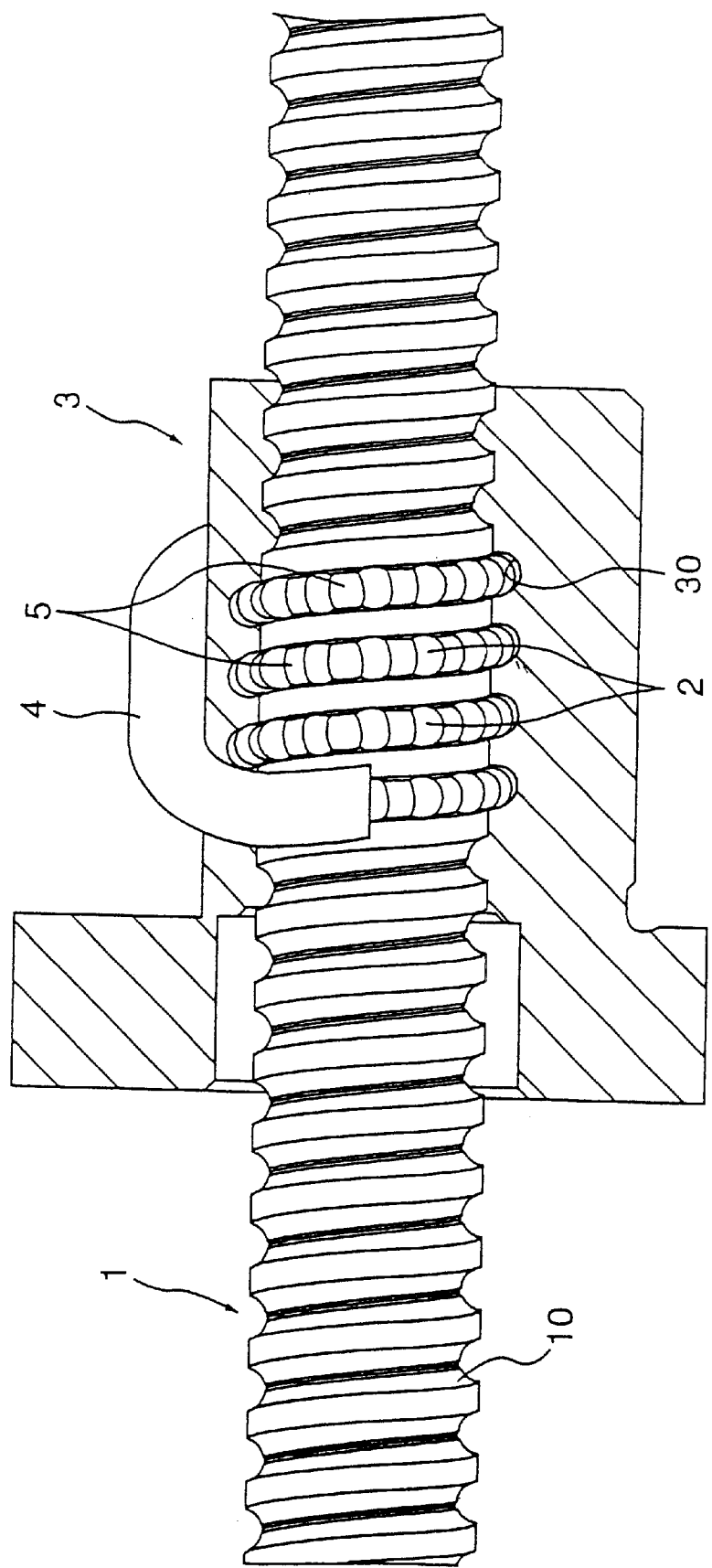
FIG. 1 is a sectioned side view showing an example of a ball screw unit in which the rolling element spacers according to the present invention are arranged with balls in an endless circulating passage.
Figure 2:
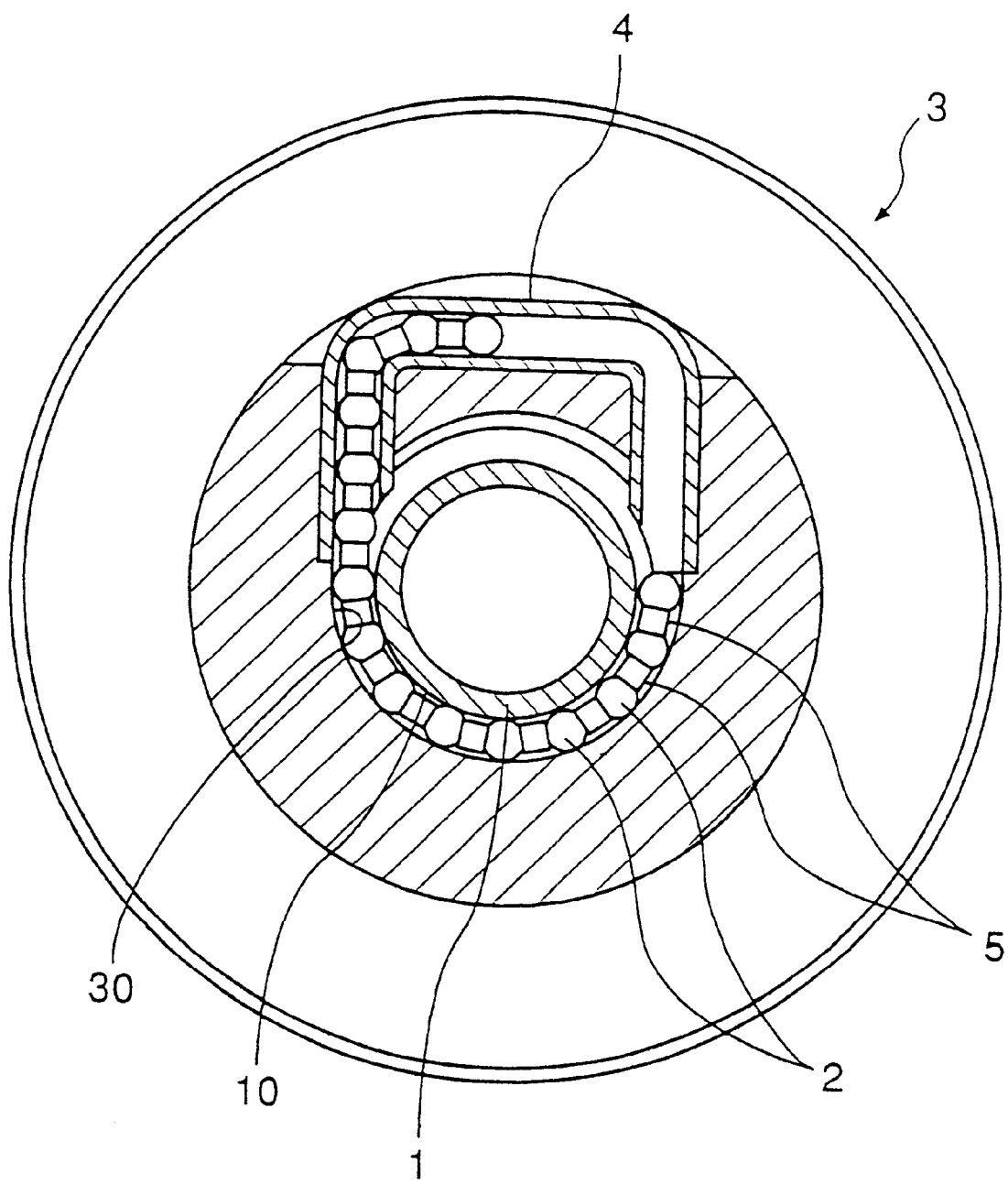
FIG. 2 is a sectioned front view of the ball screw unit shown in FIG. 1.

FIGS. 1 and 2 show an example of a ball screw unit in which the rolling element spacers according to the present invention are arranged with balls in an endless circulating passage. Referring to the same drawings, a reference numeral 1 denotes a screw shaft, 2 balls, and 3 a nut member, which is screwed on the screw shaft 1 via the plural balls 2.

The screw shaft 1 is provided in an outer circumferential surface thereof with a helical ball rolling groove 10, while the nut member 3 is provided in an inner circumferential surface thereof with a helical load rolling groove 30 opposed to the ball rolling groove 10 of the screw shaft 1. These ball rolling groove 10 and load rolling groove 30 form a helical load ball passage between the screw shaft 1 and nut member 3. Namely, when a relative rotational movement occurs on the screw shaft 1 and nut member 3, the balls 2 roll helically in the load ball passage as the balls 2 impart a load to the same passage. The nut member 3 is provided with a return pipe 4 communicating and connecting both ends of the load ball passage with and to each other and thereby forming an endless circulating passage for the balls 2. The balls 2 which have finished rolling in the load ball passage, and which have been released from a load, are put in a no-load condition, and roll in the return pipe 4. The balls 2 then jump over a distance corresponding to several turns of the ball rolling groove 10, and are returned to an inlet of the load ball passage. Therefore, when the screw shaft 1 and nut member 3 make a relative rotational movement, the balls 2 roll from the load ball passage to the return pipe 4, and from the return pipe 4 to the load ball passage, i.e., the balls are circulated in the interior of the endless circulating passage formed of these load ball passage and return pipe 4.

Figure 3:
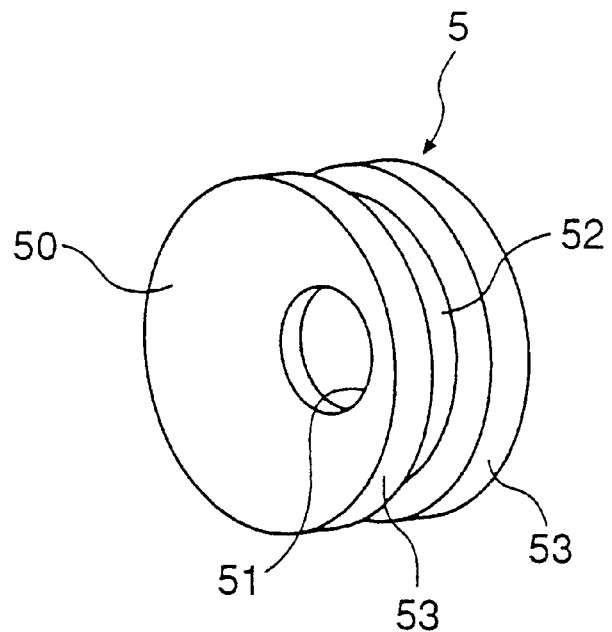
FIG. 3 is a perspective view showing a first embodiment of the rolling element spacer according to the present invention.
Figure 4:
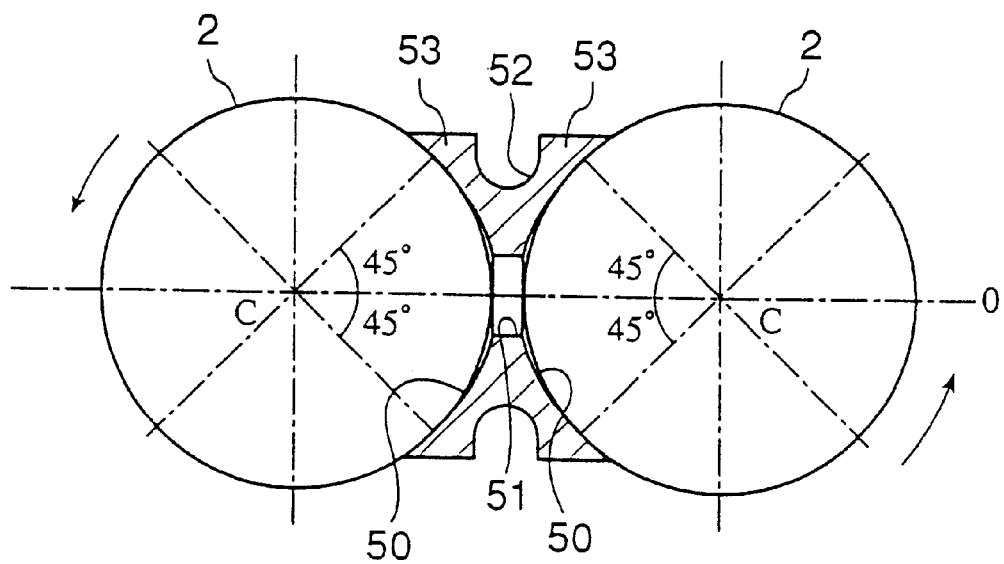
FIG. 4 is a sectional view showing the rolling element spacer of the first embodiment interposed between balls.

In this ball screw unit, rolling element spacers 5 are interposed between adjacent balls 2, 2 so as to prevent the balls 2 inserted in the endless circulating passage from contacting each other. As shown in FIGS. 3 and 4, each of these rolling element spacers 5 is obtained by forming a synthetic resin substantially to the shape of a disc, and has on both front and rear sides thereof retaining seats 50 which the balls 2 slidingly contact. The balls 2 and rolling element spacers 5 are arranged alternately in the endless circulating passage. This prevents the balls 2 rolling in the endless circulating passage from contacting each other, and enables the balls 2 to be circulated smoothly, a rotational movement of the nut member 3 with respect to the screw shaft 1 to be made smoothly, and the occurrence of sounds of collision of the balls during an operation of the ball screw unit to be reduced.

The retaining seat 50 is formed substantially conically, and obtained by turning a curve, the radius of curvature of which is larger than that of the surface of the ball 2, around a center axis O of rolling element spacer 5. Namely, on a ball cutting plane perpendicular to the center C of rotation of the ball 2, the retaining seat 50 is formed of a combination of two arcs. The ball 2 annularly and linearly contacts the retaining seat 50. As shown in FIG. 4, on a ball cutting plane perpendicular to the center C of rotation of the ball 2, each retaining seat 50 contacts the ball 2 at only the two portions of the former which are in the vicinity of both ends thereof. Namely, a clearance is necessarily formed between the ball 2 and ball retaining seat 50 so that the width of the clearance increases gradually toward the center of the ball retaining seat 50. The retaining seat 50 and ball 2 are arranged so that a contact region of the retaining seat 50 and ball 2 expands in the direction in which the ball 2 rolls, i.e., at an angle of 45° with respect to the center axis O of the rolling element spacer 5. Owing to this arrangement, when the balls 2 and rolling element spacers 50 are arranged without causing clearances to occur among these parts in the endless circulating passage of the ball screw unit, the spherical surface of each ball 2 fits in the relative substantially conically shaped retaining seat 50, and each ball 2 sits stably in the relative retaining seat 50. Therefore, the balls 2 do not unstably shake on the ball retaining seats 50 of the rolling element spacer 5, so that the balls 2 and rolling element spacers 5 can be circulated without causing these parts to meander in such an endless circulating passage.

Each rolling element spacer 5 is provided in the center thereof with a communication hole 51 so that the communication hole 51 extends through a pair of retaining seats 50 thereof which face in the opposite directions, a lubricant deposited on the relative balls 2 being collected in this communication hole 51. As mentioned above, in the vicinity of the centers of the retaining seats 50, clearances exist between the balls 2 and retaining seats 50, so that clearances, the width of which is very small, exist between the balls 2 and retaining seats 50 even in regions around the communication hole 51. Therefore, when the balls 2 rotate, the lubricant in the communication holes 51 is involved between the balls 2 and retaining seats 50, and the surfaces of the rolling element spacers 5 and those of the balls 2 are lubricated.

Furthermore, an annular groove 52 is formed in the outer circumferential surface of each rolling element spacer 5 which surrounds the retaining seats 50 thereof, and an outer circumferential edge portion of such a rolling element spacer 5 is divided into two, i.e. a pair of annular projections 53, 53. The ball 2 contacts only the portion of a relative annular projection 53 of a relative ball retaining seat 50 that is in the vicinity of a free end thereof, and does not contact the retaining seat 50 of the rolling element spacer 5 at the portion which is in the vicinity of the center thereof. Therefore, when a distance between adjacent balls 2, 2 decreases during the circulation thereof in the endless circulating passage, the annular projections 53 are deformed elastically with ease to absorb the variation of the distance between the balls 2. Namely, the rolling element spacers 5 thus formed play the roles of cushions absorbing the variation of the distance between the balls 2, and eliminate trouble of quarreling movements of the balls 2 in the endless circulating passage. These rolling element spacers contribute to the smoothing of the circulation of such balls 2.

Figure 5:
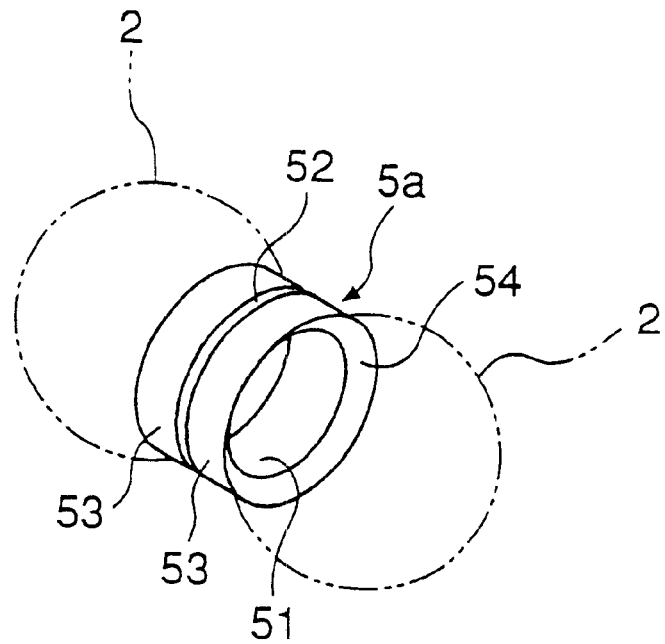
FIG. 5 is a perspective view showing a second embodiment of the rolling element spacer according to the present invention.

FIG. 5 shows a second embodiment of the rolling element spacer according to the present invention. A rolling element spacer 5a of this embodiment has a structure substantially identical with that of the rolling element spacer 5 of the first embodiment shown in FIG. 3 and FIG. 4. In the rolling element spacer of the second embodiment, the diameter of a communication hole 51 formed in the center thereof is larger than that of the rolling element spacer 5 of the first embodiment, so that such a quantity of lubricant that corresponds to the diameter-increased portion of the communication hole 51 can be additionally stored therein. To be concrete, a communication hole 51 the diameter of which is around ⅔ of that of the rolling element spacer 5a was formed. A retaining seat 54 which the ball 2 contacts is formed to a concave shape substantially in conformity with the shape of the spherical surface of the ball 2 so that the whole surface of the retaining seat 54 contacts the spherical surface of the ball 2. Even when the ball 2 thus contacts the whole surface of the retaining seat 54, the contact area of the ball 2 and retaining seat 54 does not extremely increase since the communication hole 51 is formed sufficiently large, and the rolling element spacer 5a does not substantially cause a sliding contact resistance of the ball 2 to increase in comparison with the rolling element spacer 5 of the first embodiment. The structures in the second embodiment which are identical with the corresponding structures in the first embodiment are designated by reference numerals identical with those in the first embodiment, and a detailed description thereof is omitted.

In the rolling element spacer 5a thus formed of the second embodiment, the spherical surface of the ball 2 also fits in the retaining seat 54, and the ball 2 sits in a stable condition on the retaining seat 54. Accordingly, the balls 2 can be circulated in the endless circulating passage without causing the balls 2 to shake unstably on the ball retaining seats 54 of the rolling element spacers 5a, and without causing the balls 2 and rolling element spacers 5a to meander in the same circulating passage.

Figure 6:
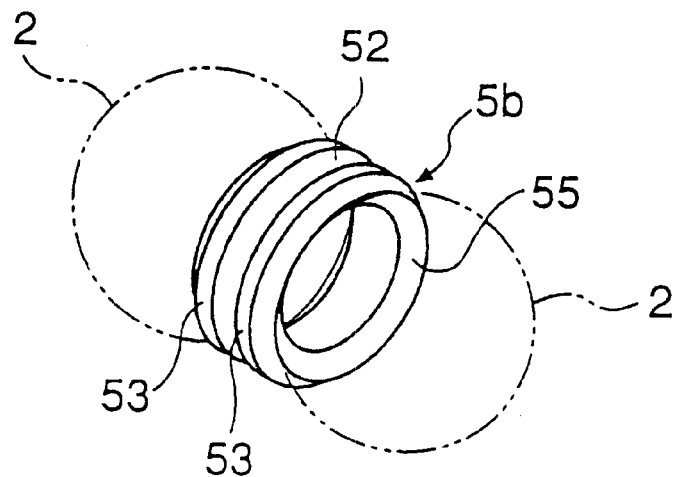
FIG. 6 is a perspective view showing a third embodiment of the rolling element spacer according to the present invention.
Figure 7:
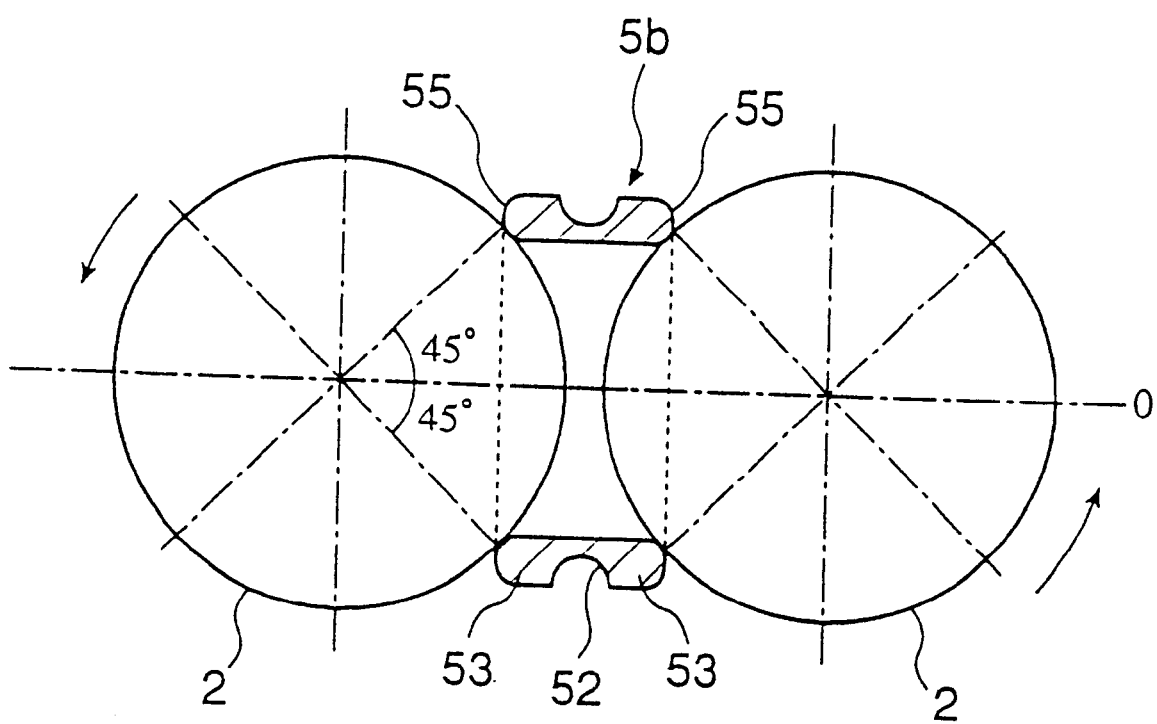
FIG. 7 is a sectional view showing the rolling element spacer of the third embodiment interposed between balls.

Next, FIG. 6 and FIG. 7 show a third embodiment of the rolling element spacer according to the present invention. A rolling element spacer 5b of this embodiment has a structure substantially identical with that of the rolling element spacer 5a of the second embodiment shown in FIG. 5 but the shape of the retaining seat 55 which the ball 2 contacts is different from that of the retaining seat 50 in the first embodiment or the retaining seat 54 in the second embodiment. As shown in a sectional view of FIG. 7, such a retaining seat 55 is formed not to a concave shape but to a convex shape so that the spherical surface of the ball 2 line contacts the retaining seat annularly. A contacting region of the retaining seat 55 and ball 2 is provided so as to expand in the rolling direction of the ball 2, i.e., at an angle of 45° with respect to the center O of the rolling element spacer 5b. The rolling element spacer of this embodiment is identical in this respect with those 5, 5a of the first and second embodiments.

Owing to this arrangement, when the balls 2 and rolling element spacers 5b of the third embodiment are arranged without causing a clearance to occur therebetween in the endless circulating passage in the ball screw unit, the balls 2 do not shake unstably either on the ball retaining seats 50 of the rolling element spacer 5b, and the balls 2 and rolling element spacers 5b can be circulated without causing the same parts to meander in the endless circulating passage.

In each of these embodiments, the descriptions are given with the rolling element spacers, which are interposed among the balls 2, taken as examples but the embodiments can be formed in the same manner even when the rolling elements are rollers.

What is claimed is:

1. Rolling element spacers used in a rolling guide unit in which a pair of members make a continuous relative movement via a row of endlessly circulated rolling elements, interposed between adjacent rolling elements in an endless circulating passage, and circulated with the rolling elements, characterized in that:

each of the rolling element spacers is provided with a pair of retaining seats which the rolling elements contact, the rolling elements contacting only the two portions of each retaining seat which are in the vicinity of both ends thereof, on a rolling element cutting plane perpendicular to the axis of rotation of each rolling element.

2. Rolling element spacers according to claim 1, wherein the two contact regions formed by the retainer seat and rolling element are provided so as to expand at an angle of 45° in the rolling direction of the rolling element.

3. Rolling element spacers according to claim 1 or 2, wherein central portions of the pair of retaining seats are provided with a through communication hole extending between these retaining seats.

4. Rolling element spacers according to claim 1 or 2, wherein, on a rolling element cutting plane perpendicular to the center of rotation of the rolling element, each retaining seat is formed of a combination of two arcs.

5. Rolling element spacers according to claim 1 or 2, wherein a groove is formed in an outer circumferential surface surrounding a circumference of the retaining seats, whereby an elasticity in the direction of the arrangement of the rolling elements is given to each rolling element spacer.

* * * * *